US007953075B2

(12) United States Patent
Huo

(10) Patent No.: US 7,953,075 B2
(45) Date of Patent: May 31, 2011

(54) METHODS AND APPARATUS FOR IMPLEMENTING A PROTOCOL FORMAT CAPABLE OF HANDLING SHARED AND DEDICATED RADIO RESOURCES

(75) Inventor: David Di Huo, Newton, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1094 days.

(21) Appl. No.: 11/345,164

(22) Filed: Feb. 1, 2006

(65) Prior Publication Data

US 2006/0126623 A1 Jun. 15, 2006

Related U.S. Application Data

(63) Continuation of application No. 09/967,537, filed on Sep. 28, 2001, now abandoned.

(51) Int. Cl.
H04L 12/28 (2006.01)

(52) U.S. Cl. .................................. 370/389; 370/338

(58) Field of Classification Search .................. 370/329, 370/335, 336, 337, 338, 342, 347, 349, 389, 370/392, 328, 465
See application file for complete search history.

(56) References Cited

U.S. PATENT DOCUMENTS

| | | | |
|---|---|---|---|
| 6,507,567 B1* | 1/2003 | Willars | 370/321 |
| 6,542,466 B1* | 4/2003 | Pashtan et al. | 370/235 |
| 6,674,739 B1* | 1/2004 | Lee et al. | 370/342 |
| 6,701,151 B2* | 3/2004 | Diachina et al. | 455/452.1 |
| 6,721,573 B2* | 4/2004 | Silvestri | 455/463 |
| 6,738,634 B1* | 5/2004 | Shin | 455/466 |
| 6,807,192 B2* | 10/2004 | Terry | 370/469 |
| 7,020,106 B2* | 3/2006 | Barnard et al. | 370/329 |
| 2001/0022784 A1* | 9/2001 | Menon et al. | 370/352 |
| 2002/0024937 A1* | 2/2002 | Barnard et al. | 370/278 |
| 2002/0145988 A1* | 10/2002 | Dahlman et al. | 370/335 |
| 2005/0101245 A1* | 5/2005 | Ahmavaara | 455/1 |

OTHER PUBLICATIONS

GSM, European Standard (Telecommunications Series) "Digital Cellular Telecommunications System (Phase 2+); Mobile Station—Base Station System (MS—BSS) Interface; Data Link (DL) Layer Specification" ETSI EN 300 938 V8.0.0, (Mar. 2000), pp. 14-21(1999).*

(Continued)

*Primary Examiner* — Ricky Ngo
*Assistant Examiner* — Christine Ng
(74) *Attorney, Agent, or Firm* — Ryan, Mason & Lewis, LLP

(57) ABSTRACT

Methods and apparatus are disclosed that implement a protocol format capable of handling shared and dedicated resources. A combined dedicated/shared protocol is used to enable dedicated data to be transmitted over shared wireless networks. In particular, the protocol is a combined DLC/MAC protocol. Header information for L2 headers are modified so that a receiving MAC will appropriately route and interpret the data. The data will be routed to the portion of the network supporting dedicated resources (e.g., DLC) if the header information is a predetermined value. Otherwise, the data is routed to the portion of the network supporting shared resources (e.g., RLC/MAC). The protocol of the present invention does not interfere with existing transceivers.

18 Claims, 8 Drawing Sheets

OTHER PUBLICATIONS

Digital Cellular Telecommunications System (Phase 2+); General Packet RadioService (GPRS); Mobile Station (MS)—Base Station Sïstem (BSS) Interface; Radio Link Control/Medium Access Control; GSM 04.60 V8.5.0, (Jul. 2000), pp. 16,17,100,101,107(1999).*

Global System for Mobile Communications, European Standard (Telecommunications Series) "Digital Cellular Telecommunications System (Phase 2+); Mobile Station—Base Station System (MS—BSS) Interface; Data Link (DL) Layer Specification" ETSI EN 300 938 V8.0.0, (Mar. 2000), pp. 14-21 (1999).

Global System for Mobile Communications, European Standard (Telecommunications Series) "Digital Cellular Telecommunications System (Phase 2+); General Packet Radio Service (GPRS); Mobile Station (MS)—Base Station Sïstem (BSS) Interface; Radio Link Control/Medium Access Control (RLC/MAC), protocol" GSM 04.60 V8.5.0, (Jul. 2000), pp. 16, 17, 100, 101, 107 (1999).

* cited by examiner

METHODS AND APPARATUS FOR IMPLEMENTING A PROTOCOL FORMAT CAPABLE OF HANDLING SHARED AND DEDICATED RADIO RESOURCES

CROSS-REFERENCE TO RELATED APPLICATION

This application is a continuation application of U.S. patent application Ser. No. 09/967,537, filed on Sep. 28, 2001 now abandoned.

FIELD OF THE INVENTION

The present invention relates generally to shared and dedicated wireless networks, and more particularly, to methods and apparatus for implementing a protocol format capable of handling shared and dedicated radio resources.

BACKGROUND OF THE INVENTION

Current generations of wireless networks separate shared and dedicated radio resources for devices that provide the corresponding telecommunication services. A dedicated resource, for instance, is an assigned circuit used primarily to transmit and receive voice signals. While some data may be transmitted over the circuit, such that voice and data are transmitted over the same circuit, the circuit is still assigned to the transmitter/receiver. A cellular telephone in a dedicated resource network, for example, would be assigned a particular circuit and data received from or transmitted to the cellular telephone is transmitted over the same circuit. Consequently, systems that enable transmission to and reception from such dedicated networks are commonly called circuit switched systems.

A system using shared radio resources, by contrast, allows information from multiple users to be received and transmitted over a single circuit. The information could be voice or data. Currently, shared radio resources are deployed by systems supporting packet switched services.

It should be noted that the terms "dedicated" and "shared" refer primarily to the usage of physical radio resources on the cell level in a cellular network. In general, cellular telephones or other Radio Frequency (RF) devices in a cell communicate with a base station. The base station communicates this data to the network, which could comprise an aggregate of cellular base stations connected to a Mobile Switching Center (MSC)/GPRS (General Packet Radio Service) Serving Node (GSN) or a conventional telephone system. If there are several cellular users communicating with a base station, each cellular device may (i) periodically transmit information over a certain frequency range (e.g., time multiplexing), (ii) transmit at the same time as other cellular devices, using the same or overlapping frequency ranges (e.g., code-division multiplexing), or (iii) transmit in a particular frequency range (e.g., frequency multiplexing). However, dedicated and shared resources are radio resources that the mobile user needs to access the base station, which then communicates the information received from the cellular users to another user connected to a remote base station via a radio interface or to a fixed line communication device.

Currently, each type of system has its own protocols and is separated through hardware and software. Data meant for one system does not and generally cannot travel through physical radio channels designated for the other system. For instance, data meant for a circuit switched system cannot be delivered via radio resources designated for a packet switched system. There is a movement toward combining circuit switched and packet switched systems in the radio access network. However, current circuit and packet switched systems have been developed at significant cost. Any combined system or protocol for such a combined system should support previous generation systems and protocols.

A need therefore exists for techniques that allow both packet and circuit switching techniques in the same system yet allow previous generation wireless networks to operate correctly.

SUMMARY OF THE INVENTION

Generally, the present invention provides techniques for enabling the new generation wireless networks to use both shared and dedicated resources without interfering with previous generation wireless networks.

In one aspect of the invention, systems interpret received headers of packets of information. If the header is meant for a particular layer in the system, certain bits in the header are examined. If these particular bits are a predetermined value, the system interprets the rest of the information in the packet as belonging to a dedicated radio resource protocol. If the particular bits are not the predetermined value, the system interprets the rest of the information in the packet as belonging to a shared radio resource protocol.

In another aspect of the invention, the system's protocol architecture contains a Data Link Control (DLC) layer on top of a Medium Access Control (MAC) layer. By contrast, in the current General Packet Radio Service (GPRS), only Radio Link Control (RLC) is implemented on top of MAC. The present invention, in one embodiment, proposes to let MAC control both RLC and DLC. In this embodiment, the DLC layer sends packets with data link layer headers such that the MAC layer will set the corresponding bits in the data link layer header to contain the predetermined value. A receiving system will then interpret the corresponding bits in the data link layer header as previously described. Therefore, the proposed architecture in this embodiment comprises, from top to bottom, DLC+RLC, MAC and PHY, compared to the current packet switched system with RLC, MAC and PHY, and to the separate current circuit switched system with DLC and PHY.

A more complete understanding of the present invention, as well as further features and advantages of the present invention, will be obtained by reference to the following detailed description and drawings.

DETAILED DESCRIPTION

The present invention provides techniques for implementing a protocol format capable of handling shared and dedicated radio resources. The present invention allows conventional (referred to as "previous generation" herein) wireless networks to operate with the new data without ever having to change the existing protocols. Essentially, these previous generation wireless networks ignore the new protocol. However, wireless networks in accordance with the present invention will use the new protocol to handle both shared and dedicated radio resources.

Figure 1:
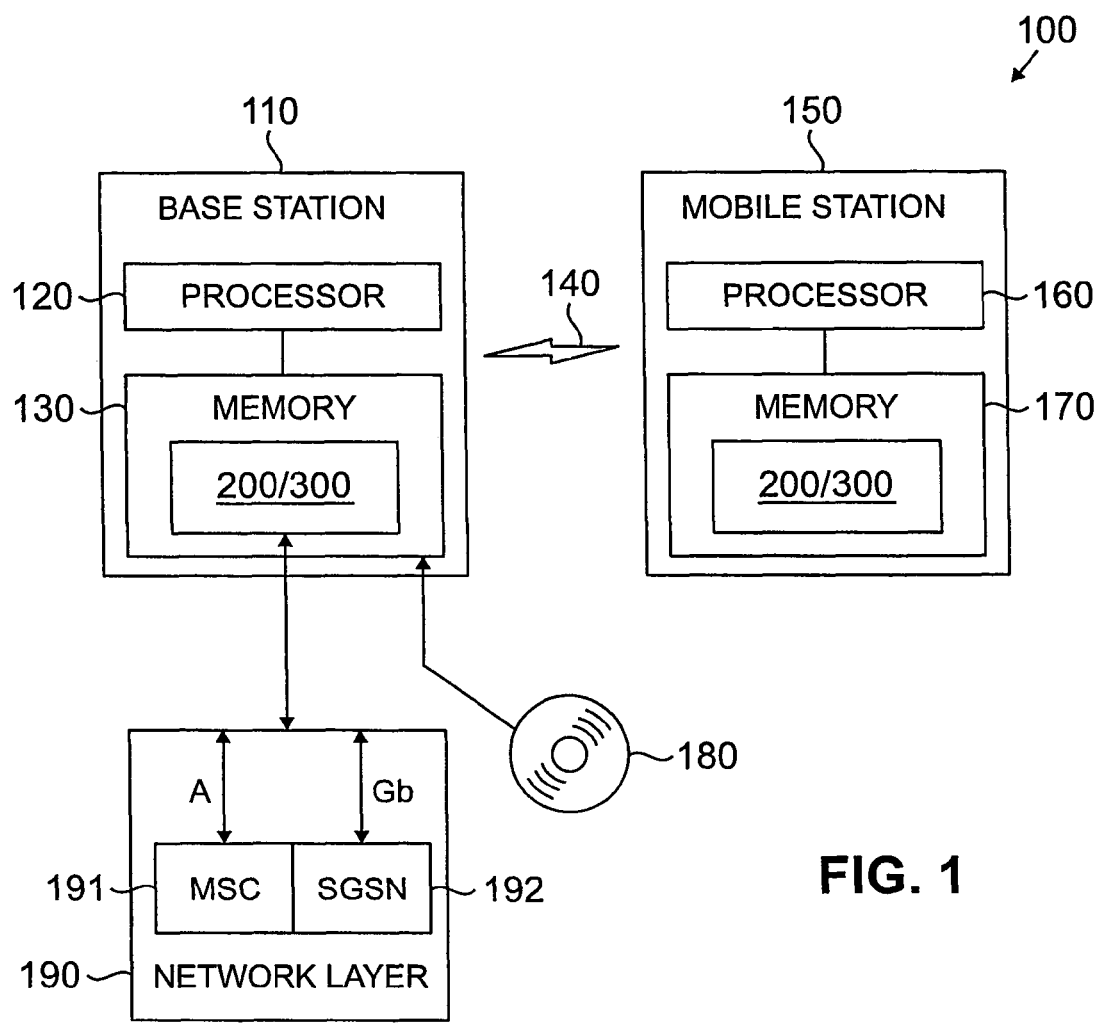
FIG. 1 is a block diagram of a wireless network operating in accordance with a preferred embodiment of the invention.

Referring now to FIG. 1, a wireless network 100 is shown operating in accordance with the present invention. Wireless network 100 comprises a base station 110 and a mobile station 150. Base station 110 and mobile station 150 communicate through a Radio Frequency (RF) channel 140, which could be a Time-Division Multiple Access (TDMA) channel, a Code-Division Multiple Access (CDMA) channel, or some other channel known to those skilled in the art. Illustratively, base station 110 is a Base Station Controller (BSC) that controls several Base Station Receiver/Transmitters (BTS), not shown, and mobile station 150 is a cellular telephone.

Base station 110 comprises a processor 120 and a memory 130. Memory 130 comprises part or all of system 200 and modified portion 300, which are explained in more detail in reference to FIGS. 2 and 3, respectively. Similarly, mobile station 150 comprises a processor 160 and a memory 170. Memory 170 comprises part or all of system 200 and modified portion 300. At a minimum, base station 130 and mobile station 150 comprise the methods and apparatus of the present invention that are used to implement a protocol capable of handling both shared and dedicated radio resources, as discussed primarily in reference to FIGS. 3 and 7-9.

Base station 110 can also communicate with a network layer 190, which allows remote users to communicate with cellphone users of base station 110. Illustratively, the network layer 190 starts with a Mobile Switching Center (MSC) 191 and, what is particularly applicable to the present invention, a Serving GPRS Support Node (SGSN) 192, which serves a General Packet Radio Service (GPRS) supporting node (not shown). MSC 191 and SGSN 192 are connected to base station 110 via an A and a Gb interface, respectively. MSCs and SGSNs are normally located very far from each other, e.g., one in New York and the other in Washington, D.C., and they are connected through fixed telephone/data lines. This is also why a cellular user can be reached by a fixed line user, and vice versa.

If there is a connection from a mobile base station 150 to another mobile base station 150 (only one of which is shown in FIG. 1), then network 100 need not comprise network layer 190. However, as is known in the art, a voice or data connection generally passes through multiple base stations 110.

A problem is that some base stations 110 are designed strictly for dedicated radio resource allocation (also called "circuit switching" herein), while others are designed solely for shared radio resource allocation (also called "packet switching" herein). As described above, dedicated and shared resources are physical radio resources on the cell level in a cellular network. Conventional systems providing dedicated and shared resources are designed with appropriate and non-compatible protocols. There are also base stations containing both systems and protocols, but the protocols and systems are still separated. In other words, one problem is that the shared radio resource packets cannot be moved over a wireless network that uses dedicated radio resources and vice versa.

The present invention allows services relying on packet switching and services relying on circuit switching to be multiplexed onto one and the same radio resource, eliminating effectively the boundary between the packet switched system and the circuit switched system in radio access network (i.e., at the cell level) The present invention also provides backwards compatibility and provides a common protocol for shared and dedicated radio resource allocation without changing the existing protocols.

As is known in the art, the methods and apparatus discussed herein may be distributed as an article of manufacture that itself comprises a computer-readable medium having computer-readable code means embodied thereon. The computer readable program code means is operable, in conjunction with a system such as base station 110 or mobile station 150, to carry out all or some of the steps to perform the methods or create the apparatuses discussed herein. The computer-readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as compact disk 180, shown in FIG. 1 interacting with base station 110.

Memories 130, 170 configure processors 120, 160 to implement the methods, steps, and functions disclosed herein. The memories 130, 170 could be distributed or local and the processors 120, 160 could be distributed or singular. The memories 130, 170 could be implemented as an electrical, magnetic or optical memory, or any combination of these or other types of storage devices. Moreover, the term "memory" should be construed broadly enough to encompass any information able to be read from or written to an address in the addressable space accessed by processors 120 or 160. With this definition, information on a network is still within memory 130, 170 because the processor 120, 160 can retrieve the information from the network. It should be noted that each distributed processor that makes up processor 120 or 160 generally contains its own addressable memory space. It should also be noted that some or all of each station 110, 150 can be incorporated into an application-specific or general-use integrated circuit. Generally, mobile station 150 will contain an application-specific circuit.

Figure 2:
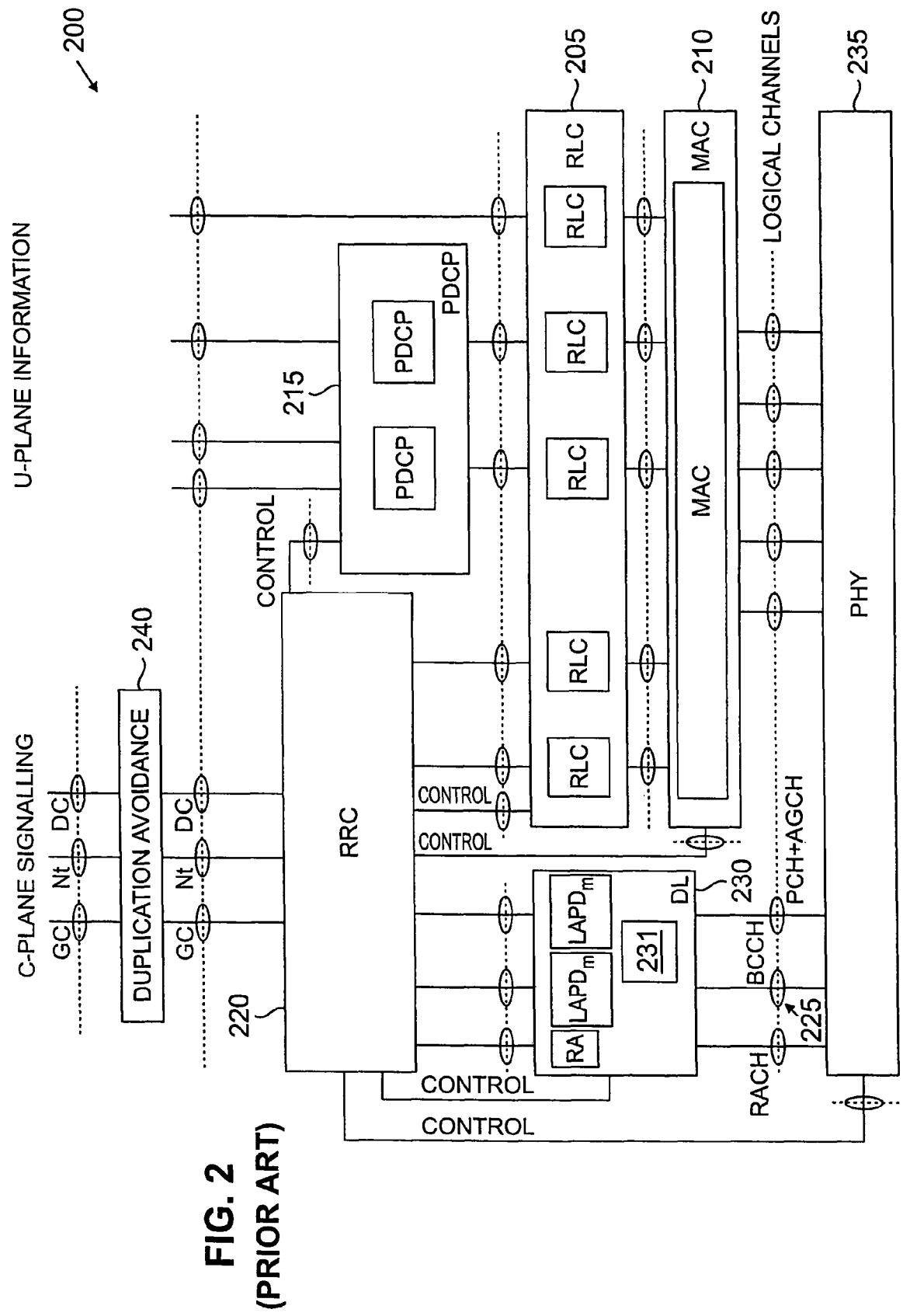
FIG. 2 is a block diagram of a prior art radio interface protocol architecture.

Referring now to FIG. 2, a prior art radio interface protocol architecture 200 is shown. Radio interface protocol architecture 200 is a proposed architecture shown in Technical Specification (TS) 43.051 V5.1.0 (April 2001) by the Technical Specification Group of the 3rd Generation Partnership Project (3GPP), the disclosure of which is incorporated herein by reference. TS 43.051 defines a stage-two service description for a Global System for Mobile Communications/Enhanced Data rates for Global Evolution (GSM/EDGE), commonly called GERAN. As described in TS 43.051, the radio interface is layered into three protocol layers: the physical layer (L1); the data link layer (L2); and the network layer (L3). Layer 2 is split into the following sublayers: Radio Link Control (RLC) 205, Medium Access Control (MAC) protocol 210, and Packet Data Convergence Protocol (PDCP) 215. RLC/MAC is used as layer 2 in the control plane below Radio Resource Control (RRC) 220, except for operation on the Broadcast Control Channel (BCCH) 225 and Common Control CHannel (CCCH), not shown, where Data Link (DL) layer 230 is used. DL layer 230 comprises a Data Link Control (DLC) 235 and Link Access Procedure on the Dm channel (LAPDm) 250.

The protocol architecture is divided into Control (C-) and User (U-) planes. The RLC 205 and MAC 210 protocols and the PHYsical layer (PHY) 235 carries data from both C- and U-plane. PDCP 215 exists in the U-plane only.

In the C-plane, Layer 3is partitioned into sublayers where the lowest sublayer, denoted as RRC 220, interfaces with layer 2 and terminates. The next sublayer 240 provides "Duplication avoidance" functionality. This and other aspects of the radio interface protocol architecture 200 are not necessary to understanding the present invention, but are described in more detail in Technical Specification 43.051.

Each block in FIG. 2 represents an instance of the respective protocol. Service Access Points (SAP) for peer-to-peer communication are marked with circles at the interface between sublayers. The SAP between MAC 210 and the physical Layer 235 provides the logical channels. In the C-plane, the interface between duplication avoidance 240 and higher L3sublayers is defined by the General Control (GC), Notification (Nt) and Dedicated Control (DC) SAPs. A description of these SAPs can be found in TS 23.110 by the 3GPP (1999), the disclosure of which is incorporated herein by reference.

Also shown in FIG. 2 are connections between RRC 220 and MAC 210 as well as RRC 220 and L1(physical Layer 235) providing local inter-layer control services. An equivalent control interface exists between RRC 220 and the RLC sublayer (i.e., DL 230 and DLC 231), and between RRC 220 and the PDCP sublayer 215. These interfaces allow the RRC 220 to control the configuration of the lower layers. For this purpose, separate control SAPs are defined between RRC 220 and each lower layer (PDCP 215, RLC 205, MAC 210, and L1235).

As is known in the art, mobile stations will generally contain a subset of the protocols shown in FIG. 2, while base stations will generally contains most or all of the protocols shown in FIG. 2 and may additionally comprise many more protocols and layers. In particular, a mobile station will generally contain an RLC/MAC and/or DCL protocol, but will not contain L3layer devices, whereas a base station will usually contain L3layer devices.

In the radio interface protocol architecture 200, the dedicated and shared radio resource protocols are separated. The dedicated radio resource protocols comprise the DL layer 230 (and its LAPDm 250 and DLC 231). The shared radio resource protocols comprise the PDCP 215, RLC 205, and MAC 210. Data originating from or being received by the DL layer 230 does not travel through the MAC 210 and associated layers. Similarly, data originating from or being received by the MAC 210 layers does not travel through the DL Layer 230.

Figure 3:
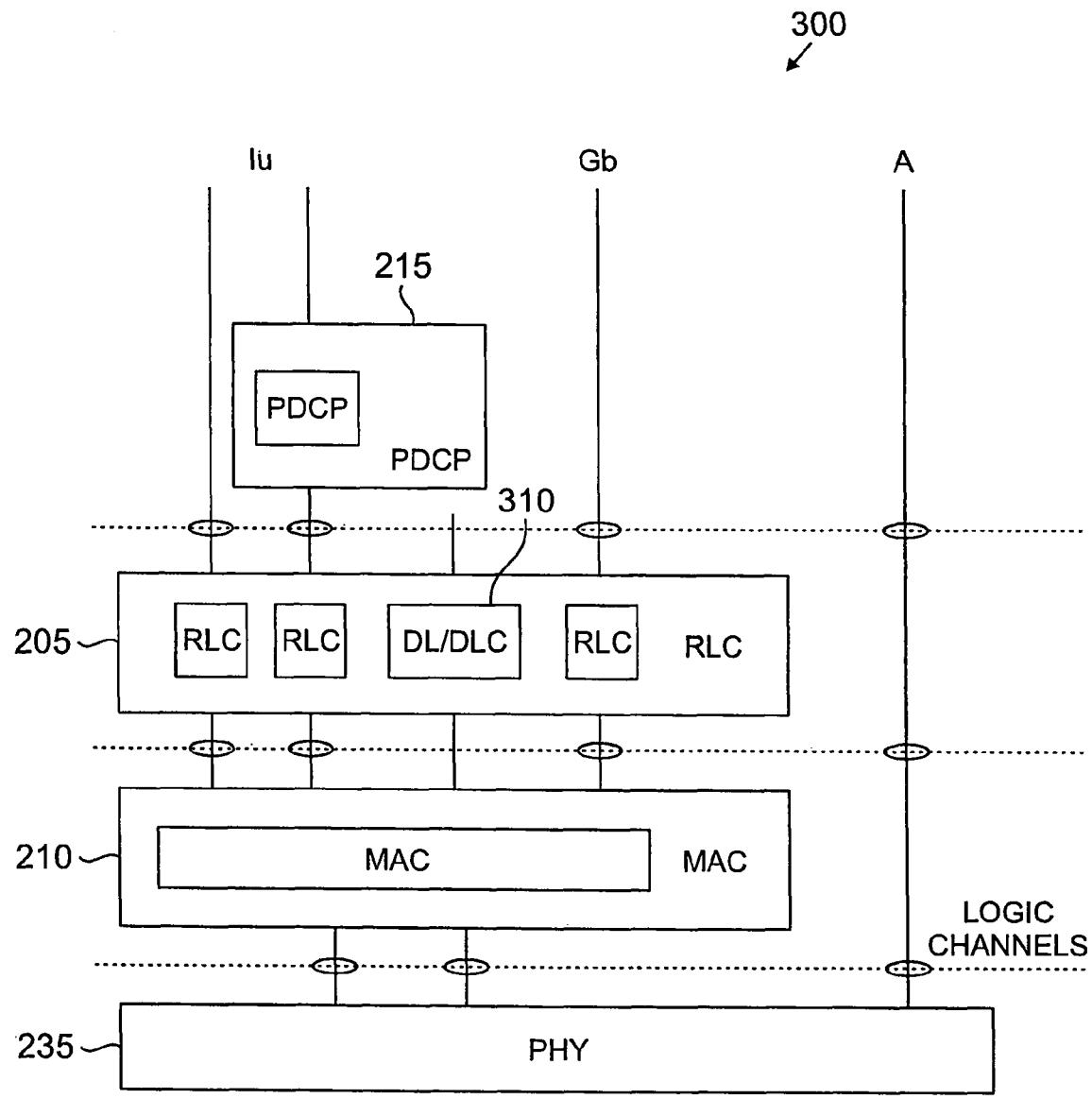
FIG. 3 is a block diagram used to illustrate part of the radio interface protocol architecture of FIG. 2 modified to implement aspects of the present invention, in accordance with a preferred embodiment of the invention.

FIG. 3 illustrates a portion 300 of the radio interface protocol architecture of FIG. 2 modified to implement aspects of the present invention, in accordance with a preferred embodiment of the invention. Portion 300 comprises PDCP 215, RLC 205, MAC 210 and PHY 235. Importantly, RLC 205 contains DL/DLC 310 functionality, which contains both DL 230 and the control DLC 231 protocols for the L2layer of a dedicated resource network. Consequently, dedicated packet traffic can move from DL/DLC 310 through MAC 210 and onto the physical Layer 235. Similarly, dedicated packet traffic can move from physical Layer 235 to MAC 210 and then to DL/DLC 310. DL/DLC 310 and MAC 210 cooperate by using a new protocol, shown and discussed below. The new protocol allows prior generation wireless networking systems to essentially ignore the new protocol but allows new wireless networking systems to determine whether packets are to be routed to shared or dedicated layers. This is described in additional detail below.

Figure 4:
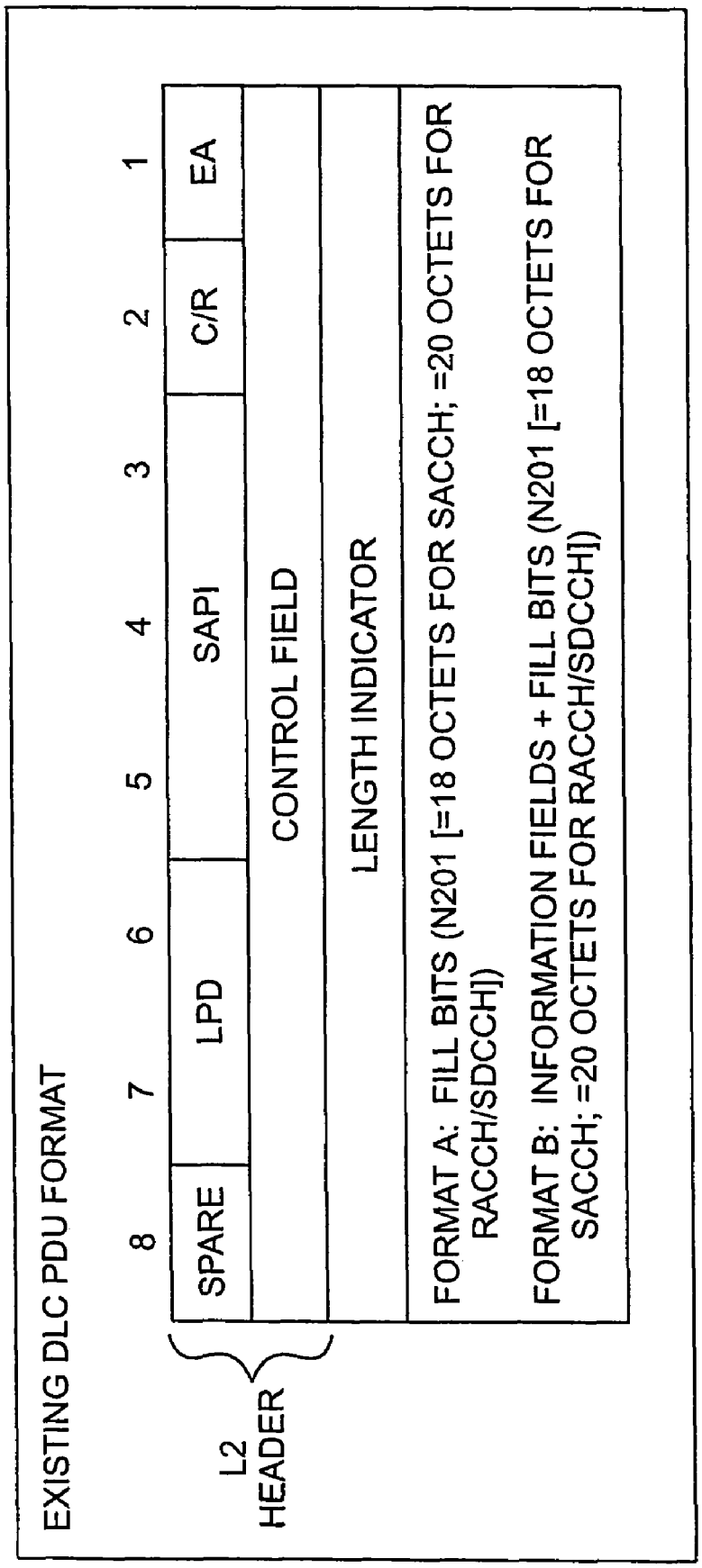
FIG. 4 is a diagram of a prior art Data Link Control (DLC) Packet Data Unit (PDU) protocol format.

Referring now to FIG. 4, a diagram is shown of a prior art DLC Packet Data Unit (PDU) protocol format 400. In physical layer L1, the channel block for the Slow Assisted Control CHannel (SACCH), Fast Assisted Control CHannel (FACCH), Packet Associated Control CHannel (PACCH), and Packet Data Traffic CHannel (PDTCH (CS1)) all have the same size of 23 octets. FACCH/PACCH/PDTCH (CS1) have no L1header, while SACCH has two octets of header for power control and timing advance information. In the data link layer, an L2layer called DL or DLC herein, the LAPDm uses five different channel block formats, where only four are relevant for the description given herein. FIG. 4 shows an L2format used by SACCH (L1header not shown) and FACCH. These channels and their protocols are defined in more detail in technical specifications 4.04 (1999) and 4.06 (1999) by the Global System for Mobile Communication (GSM), of which the 3GPP is a part. The disclosures of these technical specifications are incorporated herein by reference.

In FIG. 4, EA is an address field extension bit, C/R is a Command/Response bit, LDP is a Link Protocol Discriminator, and SAPI is a service access point identifier. Only formats A and B are shown, which are also representative for L2format B4 (which applies to unnumbered information on SACCH) and format Bter (which applies to unnumbered information for SAPI 0). Note that these formats are described in more detail in TS 4.06.

What is important are the Spare and LPD entries for the L2header. The Spare is not used and is ignored in conventional dedicated wireless networks. The LPD has allowed values of either 00 or 01. The value of 01 corresponds to the data link protocol used for Short Message Service Cell Broadcast (SMSCB). SMSCB is defined in more detail in TS 04.12 by the Global System for Mobile Communications (GSM) TS 04.12, the disclosure of which is incorporated herein by reference. Essentially, SMSCB allows data to be carried along with voice over a dedicated wireless network.

In accordance with the present invention, if the DLC and MAC are combined to allow DLC traffic over MAC, then SMSCB will not be used. Consequently, LPD is not used. If the LPD is set to 1x, where X is a "don't care" value, conventional DLC systems will essentially ignore a packet containing the LPD of 1x. A protocol that implements a different L2header that allows both DLC and MAC traffic is described below.

Figure 5:
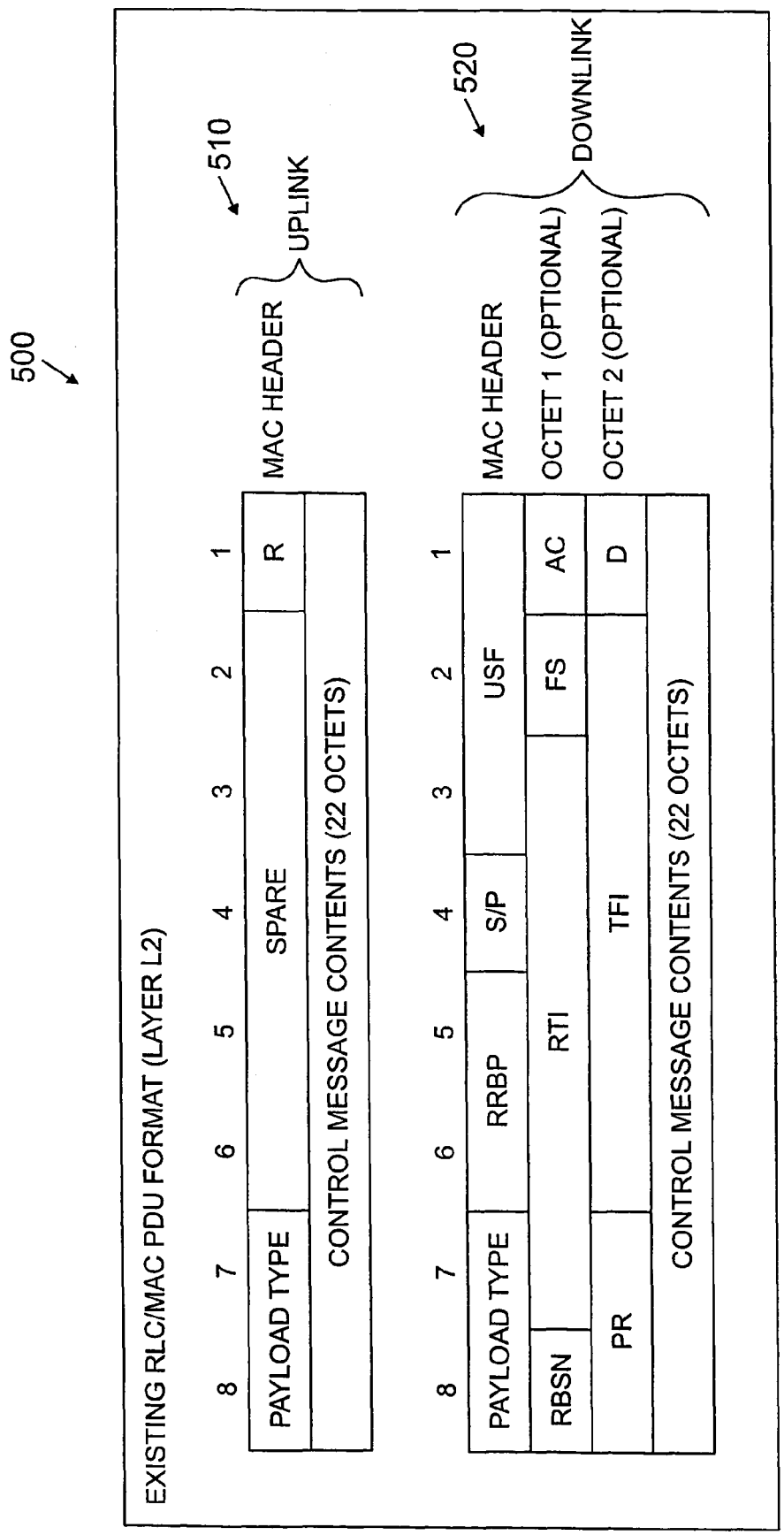
FIGS. 5 and 6 are diagrams of a prior art Radio Link Control/Media Access Control (RLC/MAC) PDU protocol format.
Figure 6:
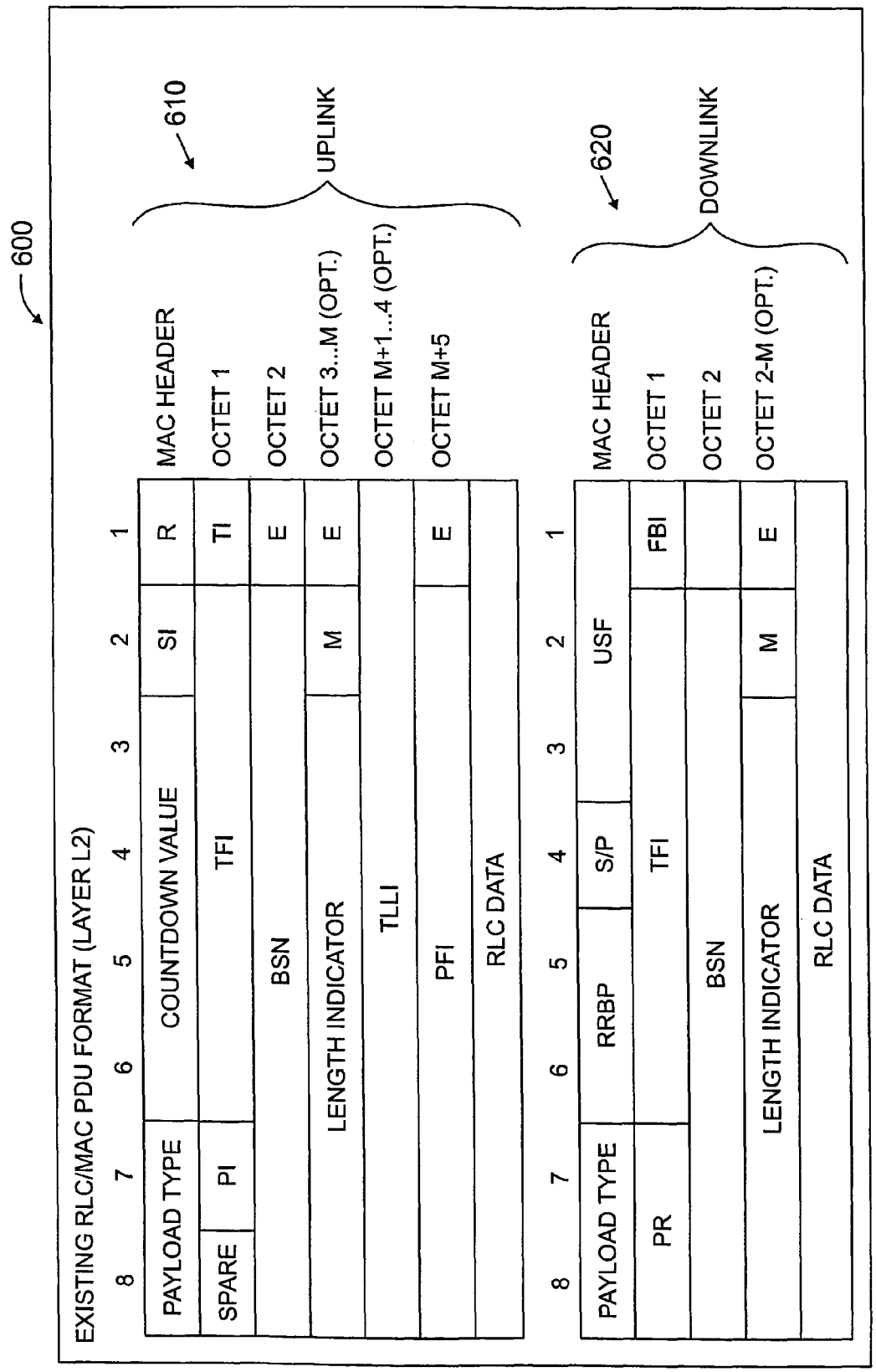

Referring now to FIG. 5, a diagram of a prior art Radio Link Control/Media Access Control (RLC/MAC) PDU protocol format 500 is shown. The protocol 500 of FIG. 5 is a General Packet Radio Service (GPRS) layer L2protocol, which is accomplished by the RLC/MAC protocol using the formats shown for uplink 510 and downlink 520. These protocols are for Packet Associated Control CHannel (PACCH). These headers and those shown in FIG. 6 are described in more detail in TS 04.60 by GSM, the disclosure of which is incorporated herein by reference. It is important to note that Payload Type of the MAC header, in both instances 510 and 520, for conventional shared resource wireless networks is allowed to contain the values 00, 01, or 10. If the value 11 is found, a conventional receiver will essentially ignore the packet. This is explained in greater detail below.

Turning now to FIG. 6, a protocol format 600 is shown for packets of PDTCH (CS1) in both uplink 610 and downlink 620. Again, in both instances 610 and 620, the payload type for conventional shared resource wireless networks is allowed to contain the values 00, 01, or 10. If the value 11 is found, a conventional receiver will essentially ignore the packet. This is explained in greater detail below.

Figure 7:
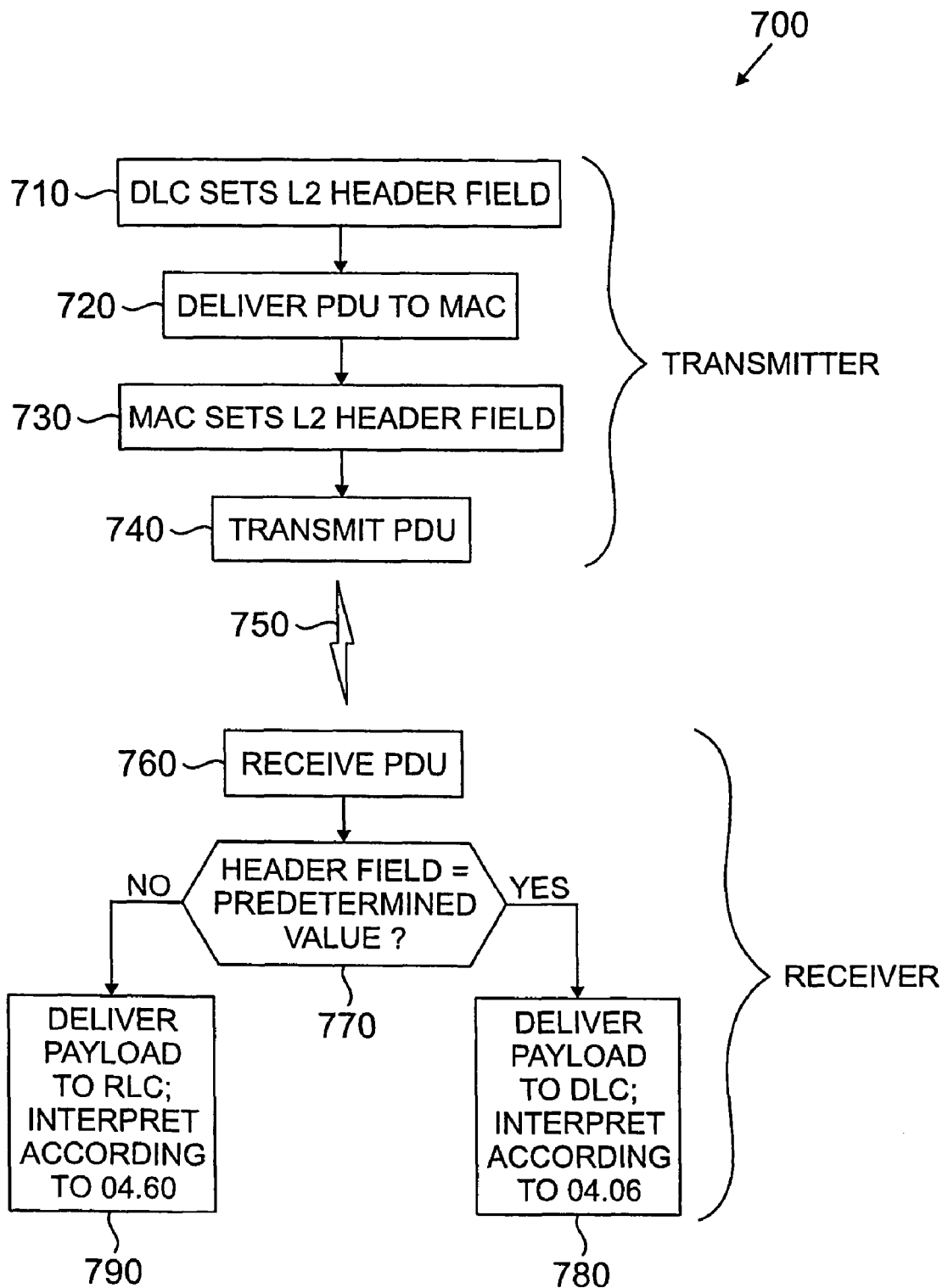
FIG. 7 is a method incorporating features of the present invention for transmitting and receiving packets using a protocol that supports both dedicated and shared radio resources.

Turning now to FIG. 7, a method 700 is shown for transmitting and receiving packets using a protocol suitable for shared and dedicated radio resources. An exemplary protocol will be described in reference to FIG. 8, after method 700 has been discussed. Under the assumption that SMSCB will not be supported by DLC in GERAN, the third-generation wireless protocol, a transmitting MAC can use the LPD field to transport DLC messages, in accordance with the techniques of FIG. 7.

Method 700 begins when a transmitting DLC sets bits {8,7,6} (see FIG. 4) of the L2header field to a first predetermined value. In one embodiment of the present invention, this value is 000. Thus, the conventional Spare and LPD fields (see FIG. 4) are set to zero. In step 720, the transmitting DLC delivers the PDU to the MAC. Note that this requires a connection between the DLC and the PDU. In conventional systems, this connection does not exist.

In step 740, the transmitting MAC sets bits {8,7,6} of the L2header field to 110. While it is possible for the DLC to set bits {8,7,6} to 110, it is recommended that the MAC set these bits. This recommendation is made for several reasons. First, it is recommended that, in systems conforming to the present invention, the DLC be subordinate to the MAC, just as the RLC is subordinate to MAC in conventional systems. Additionally, having the DLC set the bits {8,7,6} to 000 allows the MAC to ascertain that the DLC is functioning correctly. The transmitting MAC sends the PDU to the lower layer PHY for transmission (step 760), and the PDU is transmitted. Step 750 illustrates that an RF connection is used between the transmitter and receiver.

In step 760, the PDU is received. In step 770, the receiving MAC determines the values of the first three bits of the L2header. The receiving MAC can differentiate RLC PDU and DLC PDU by determining the first three bits of the L2header. If the header field Payload Type in the received L2header (i.e., the first received MAC octet) is not the value 11, the receiving MAC will interpret the payload according to TS 04.60 and deliver the payload to RLC. This occurs in step 790. If the header field Payload Type in the received L2header is the value 11, the receiving MAC will interpret the payload according to TS 04.06 and deliver the payload to DLC. This occurs in step 780.

Note that the MAC, when delivering the payload to DLC, sets bits {8,7,6} to 000 and leaves the three bits unchanged when routing the packet to the RLC. The entire PDL can now be correctly interpreted by the DLC. Note also that setting the bits {8,7,6} to zero means that the field LPD, for a previous, generation L2header for DLC, will be zero. This means that the SMSCB service will not be supported by the new DLC/MAC service. However, this is no real restriction, since a new system operating in accordance with the present invention has integrated both circuit and packet services. Hence, there is no need to deliver SMSCB via circuit switching, because packet switching is readily available.

This approach is also feasible because the current field values for the parameter "Payload Type" (as shown in FIGS. 5 and 6) of the PACCH are 00, 01, and 10, while the value 11 is reserved. According to TS 04.60, whenever a Payload Type equal to 11 is received, the legacy receiver will ignore all fields except the Uplink State Flag (USF) field. Since the USF is useless for a dedicated channel, the field will be filled with parameters C/R and EA of LAPDm. This turns a PACCH format into an LAPDm format.

To summarize the approach of the present invention, the format of the present invention is a hybrid of DLC and MAC/RLC formats and as such can be referred to as a DCL/MAC format. Moreover, a MAC operating in accordance with the present invention will be almost completely transparent in a networking system, as the MAC will be interpreting and appropriately setting a field of an L2header. DLC and RLC can operate under prior protocols, and the only "major" changes that need be made to implement the embodiments of the present invention are to the MAC.

Figure 8:
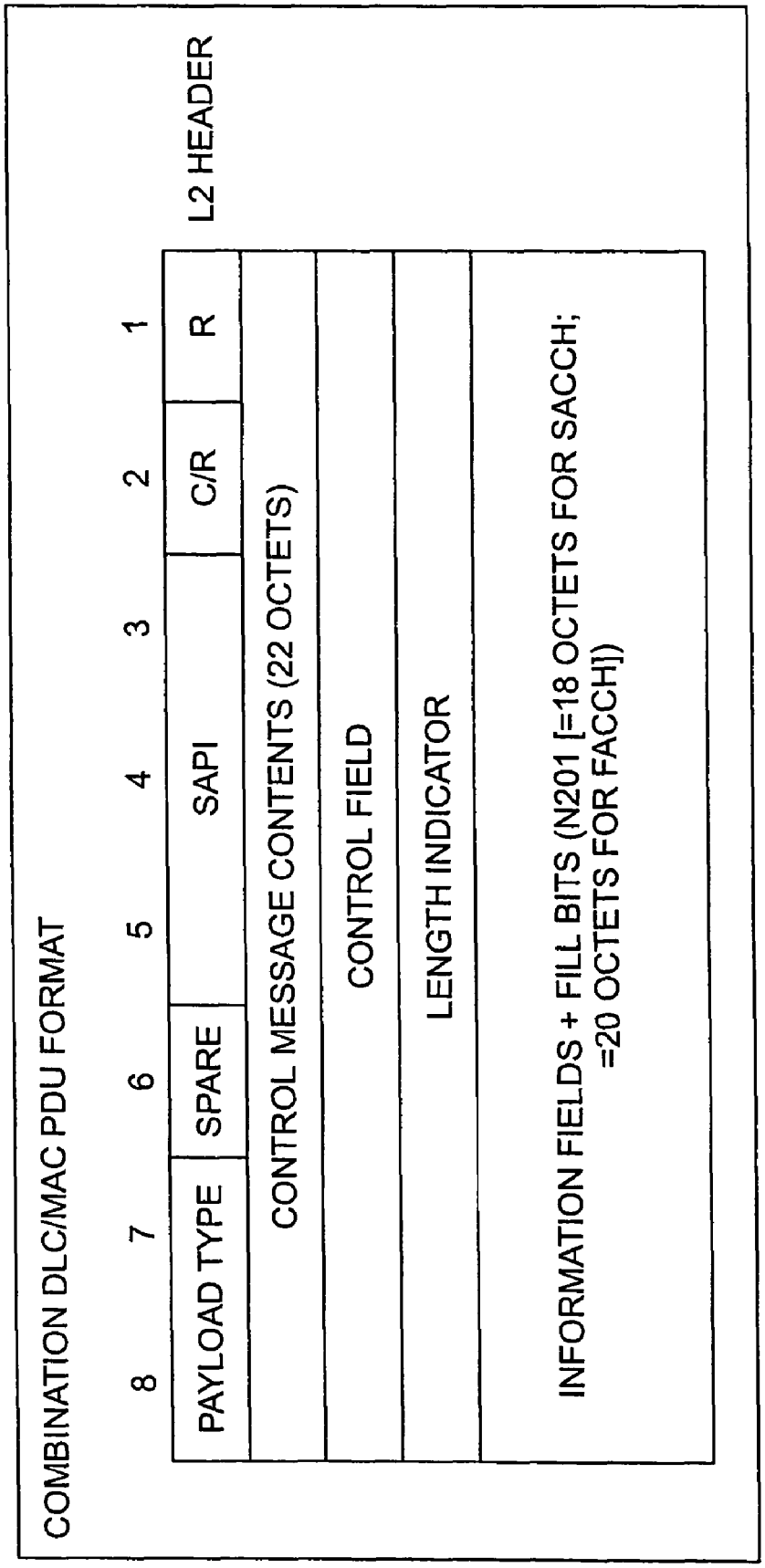
FIG. 8 is a DLC/MAC PDU protocol format in accordance with a preferred embodiment of the invention and used in the method of FIG. 7.

Referring now to FIG. 8, an exemplary DLC/MAC PDU protocol format 800 of the present invention is shown. This example uses format B of LAPDm. Application of the present invention to other LAPDm formats or RLC/MAC formats is easily performed by those skilled in the art. Essentially, the Payload Type and Spare are used in place of the Spare and LPD of the DLC PDU protocol format 500. This protocol 800 can be used as outlined in reference to FIG. 7, and it assumes that SMSCB functionality is not needed.

The DLC/MAC format of FIG. 8 can be viewed as an RLC/MAC format as well as a DLC format. It is not difficult to see that the duality of perception has further consequence in its application. The format of FIG. 8 allows sending PACCH and CS1 data over FACCH or SACCH. Note that CS1 is one of nine different PDTCH formats, but the only format for PACCH. It also allows FACCH and SACCH data over logical PACCH or CS1. Consequently, the format of FIG. 8 is capable of handling both shared and dedicated radio resources, and these resources can traverse DLC and MAC layers in accordance with the present invention.

The previous description is also applicable to the GERAN protocol architecture described in TS 43.051. Since the Payload Type parameter of the GPRS RLC/MAC protocol (shown for instance in FIGS. 5 and 6) is common to both PACCH and PDTCH (CS1), in uplink as well as downlink, the present invention applies to all GPRS RLC/MAC blocks. Thus, in order to achieve link control for a dedicated MAC channel, the MAC layer of a GERAN receiver is required to perform the following: (1) treat all data from SACCH, PACCH, and FACCH as a GPRS RLC/MAC block; (2) if the value of the Payload Type of the present invention is value 11, interpret the rest of the block according to TS 04.06 except the bits {8,7,6} of the first MAC octet; and (3) otherwise, interpret the rest of the block according to TS 04.60. This is described in reference to method 700 of FIG. 7.

Figure 9:
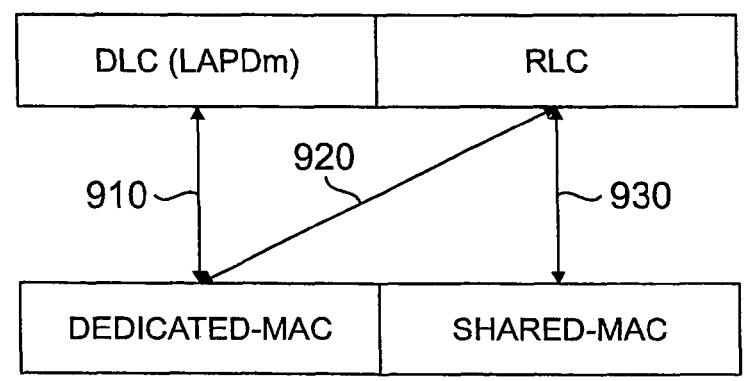
FIG. 9 is a block diagram of a protocol architecture in accordance with a preferred embodiment of the invention.

This technique makes it possible for a GERAN MAC to switch between DLC and RLC, in order to control dedicated channels in both DLC (or LAPDm) protocol and RLC protocol. This ability is illustrated by FIG. 9, which show a section of the GERAN protocol architecture incorporating the techniques of the present invention. In the conventional GERAN protocol, the connection 910 between the DLC and the dedicated-MAC and the connection 930 between the RLC and shared-MAC are defined. The present invention adds the connection 920 between the RLC and the dedicated-MAC. This connection 920 is not possible in the current GERAN architecture.

By allowing packets defined by the RLC/MAC and LAPDm protocols to be multiplexed over FACCH, PACCH, and SACCH channels, the present invention provides great flexibility to support certain channel configurations unique to GERAN Revision 4. Specifically, the architecture defined by the present invention supports the following options:

(1) Speech traffic channels on legacy transceivers, quarter rate speech traffic channels, and TCH data channels using ECSD and CSD channel coding option will not be able to support PDTCH and PACCH channels, which are usually required to support radio bearer using RLC/MAC. The architecture of the present invention allows a modest level of support for RLC/MAC radio bearers on a FACCH with CS-1 coding. This is required to support signaling bearers using RLC/MAC, and to support critical user data radio bearers such as those used for SIP call control; and (2) Dedicated channels supporting only radio bearers using PDTCH do not support FACCH. In these cases, it is desirable to have a method of supporting existing FACCH message on a PACCH channel. The techniques of the present invention allow for this.

Besides the flexibility the present invention provides, another advantage of the present invention is the fact that it requires no change to TS 04.60 and negligible change to TS 04.06.

LAPDm is a proven, reliable protocol for support DLC signaling in GSM. By embedding LAPDm protocol into GERAN protocol architecture, a MAC design can be achieved with minimum development efforts. The present invention essentially merges the RLC/MAC and LAPDm blocks, while minimizing redundant header information inherent to the RLC/MAC protocol. As a result, the approach enables the transportation of both RLC PDU and DLC PDU via logical FACCH, PACCH, and SACCH.

It is to be understood that the embodiments and variations shown and described herein are merely illustrative of the principles of this invention and that various modifications may be implemented by those skilled in the art without departing from the scope and spirit of the invention.

I claim:

1. A method for handling shared and dedicated radio resources, the method comprising the steps of:
    determining a value of a field in a header in a packet;
    when the value of the field is a predetermined value, interpreting at least a payload portion of the packet in accordance with a protocol for dedicated radio resources; and
    when the value of the field is at least one second predetermined value, interpreting at least a payload portion of the packet in accordance with a protocol for shared radio resources, wherein a data link control layer is configured to exchange packet information associated with said packet with a medium access control layer when the value of the field indicates dedicated radio resources and wherein a radio link control layer is configured to exchange said packet information with said medium access control layer when the value of the field indicates shared radio resources.

2. The method of claim 1, wherein the field comprises two bits, wherein the predetermined value is 11, and wherein the at least one second predetermined value comprises three values of 00, 01, and 10.

3. The method of claim 1, wherein the protocol for dedicated radio resources is defined by Technical Standard 04.06 of the Global System of Mobil Communication (GSM) group, and wherein the protocol for shared radio resources is defined by TS 04.60 of the GSM group.

4. The method of claim 1, wherein the step of interpreting the packet in accordance with a protocol for dedicated radio resources further comprises the step of routing the packet to a device adapted to implement the step of interpreting the packet in accordance with a protocol for dedicated radio resources, and wherein the step of interpreting the packet in accordance with a protocol for shared radio resources further comprises the step of routing the packet to a device adapted to implement the step of interpreting the packet in accordance with a protocol for shared radio resources.

5. The method of claim 1, wherein the field comprises three bits, wherein the step of interpreting the packet in accordance with a protocol for dedicated radio resources further comprises the step of (a) setting the field to a value of 000 prior to interpreting all of the header of the packet in accordance with a protocol for dedicated radio resources, and wherein the step of interpreting the packet in accordance with a protocol for shared radio resources further comprises the step of interpreting all of the header of the packet in accordance with a protocol for shared radio resources.

6. The method of claim 1, wherein the header is the first octet of a data link layer packet, and wherein the packet is a Packet Data Unit (PDU).

7. The method of claim 6, further comprising the steps of:
    setting the field to a first value;
    setting the field to a second value; and
    transmitting the PDU.

8. The method of claim 6, wherein:
    the field comprises three bits;
    the method further comprises the step of receiving the PDU;
    the step of interpreting the packet in accordance with a protocol for dedicated resources further comprises the step of setting the three bits to 000 prior to interpreting the packet in accordance with a protocol for dedicated resources.

9. A method for handling shared and dedicated radio resources, the method comprising the steps of:
    determining a value of a field in a header in a packet;
    when the value of the field is a predetermined value, routing the packet to a device adapted to control dedicated radio resources; and
    when the value of the field is at least one second predetermined value, routing the packet to a device adapted to control shared radio resources, wherein a data link control layer is configured to exchange packet information associated with said packet with a medium access control layer when the value of the field indicates dedicated radio resources and wherein a radio link control layer is configured to exchange said packet information with said medium access control layer when the value of the field indicates shared radio resources.

10. An apparatus comprising:
    a memory that stores computer-readable code;
    a processor operatively coupled to the memory, the processor configured to implement the computer-readable code, the computer-readable code configured to:
    determine a value of a field in a header in a packet;
    when the value of the field is a predetermined value, interpret at least a payload portion of the packet in accordance with a protocol for dedicated radio resources; and
    when the value of the field is at least one second predetermined value, interpret at least a payload portion of the packet in accordance with a protocol for shared radio resources, wherein a data link control layer is configured to exchange packet information associated with said packet with a medium access control layer when the value of the field indicates dedicated radio resources and wherein a radio link control layer is configured to exchange said packet information with said medium access control layer when the value of the field indicates shared radio resources.

11. An article of manufacture comprising:
a computer-readable medium having computer-readable code means embodied thereon, the computer-readable code means comprising:
a step to determine a value of a field in a header in a packet;
when the value of the field is a predetermined value, a step to interpret at least a payload portion of the packet in accordance with a protocol for dedicated radio resources; and
when the value of the field is at least one second predetermined value, a step to interpret at least a payload portion of the packet in accordance with a protocol for shared radio resources, wherein a data link control layer is configured to exchange packet information associated with said packet with a medium access control layer when the value of the field indicates dedicated radio resources and wherein a radio link control layer is configured to exchange said packet information with said medium access control layer when the value of the field indicates shared radio resources.

12. A transmitter comprising:
a first device adapted to set a field of a header of a packet to a first value;
a second device adapted to set the field of the header to a second value, wherein a predetermined value of the field indicates that at least a payload portion of the packet is to be interpreted in accordance with a protocol for dedicated radio resources and at least one additional value of the field indicates that at least a payload portion of the packet is to be interpreted in accordance with a protocol for shared radio resources; and
a third device adapted to transmit the packet, wherein a data link control layer is configured to exchange packet information associated with said packet with a medium access control layer when the value of the field indicates dedicated radio resources and wherein a radio link control layer is configured to exchange said packet information with said medium access control layer when the value of the field indicates shared radio resources.

13. The transmitter of claim 12, wherein the first device is a data link controller, the second device is a media access controller, and the third device is a physical layer.

14. The transmitter of claim 13, wherein the data link controller is part of a radio link controller, wherein the data link controller is adapted to control dedicated radio resources, and wherein the radio link controller is adapted to control shared radio resources.

15. A receiver comprising:
a first device adapted to control dedicated radio resources;
a second device adapted to control shared radio resources;
a third device adapted to determine a value of a field in a header in a packet, the third device routing the packet to the first device when the value of the field is a predetermined value and routing the packet to the second device when the value of the field is at least one second predetermined value, wherein a data link control layer is configured to exchange packet information associated with said packet with a medium access control layer when the value of the field indicates dedicated radio resources and wherein a radio link control layer is configured to exchange said packet information with said medium access control layer when the value of the field indicates shared radio resources.

16. The receiver of claim 15, wherein the receiver is coupled to physical radio resources on a cell level in a wireless network and to multiple users, wherein data from only one user is allowed per a dedicated radio resource of the physical radio resources, and wherein data from a plurality of the users is allowed per a shared radio resource of the physical radio resources.

17. The receiver of claim 15, wherein the first device is a data link controller, wherein the second device is a radio link controller, and wherein the third device is a media access controller.

18. The receiver of claim 15, wherein:
the field comprises three bits; and
the third device is adapted to set the three bits to 000 prior to routing the packet to the first device, and is adapted to leave the three bits unchanged when routing the packet to the second device.

* * * * *